United States Patent
Boileau et al.

(10) Patent No.: US 9,957,056 B2
(45) Date of Patent: May 1, 2018

(54) PROPULSION UNIT FOR AN AIRCRAFT

(71) Applicants: AIRCELLE, Gonfreville l'Orcher (FR); SNECMA, Paris (FR)

(72) Inventors: Patrick Boileau, Tournefeuille (FR); Pierre Caruel, Le Havre (FR); Carmen Ancuta, Paris (FR); Bruno Beutin, Evry (FR)

(73) Assignees: AIRCELLE, Gonfreville l'Orcher (FR); SNECMA, Paris (FR)

( * ) Notice: Subject to any disclaimer, the term of this patent is extended or adjusted under 35 U.S.C. 154(b) by 313 days.

(21) Appl. No.: 14/716,969

(22) Filed: May 20, 2015

(65) Prior Publication Data

US 2015/0367946 A1  Dec. 24, 2015

(30) Foreign Application Priority Data

Dec. 12, 2012 (FR) ...................................... 12 61960

(51) Int. Cl.
*B64D 27/16* (2006.01)
*B64D 29/08* (2006.01)
(Continued)

(52) U.S. Cl.
CPC ............ *B64D 27/16* (2013.01); *B64D 29/00* (2013.01); *B64D 29/08* (2013.01); *F02K 1/78* (2013.01); *F02K 3/06* (2013.01); *F05D 2230/72* (2013.01)

(58) Field of Classification Search
CPC ......... B64D 27/16; B64D 29/00; B64D 29/08
See application file for complete search history.

(56) References Cited

U.S. PATENT DOCUMENTS 4,920,744 A * 5/1990 Garcia ................... B64D 29/08
244/54
5,228,641 A * 7/1993 Remlaoui ................. F02K 1/72
239/265.31
(Continued)

FOREIGN PATENT DOCUMENTS

FR  2 901 244 A1  11/2007
FR  2 912 378 A1  8/2008
(Continued)

OTHER PUBLICATIONS

International Search Report dated Apr. 25, 2014 in International Application No. PCT/FR2013/053048.

*Primary Examiner* — Justin M Benedik
(74) *Attorney, Agent, or Firm* — Burris Law, PLLC

(57) ABSTRACT

The present disclosure relates to a propulsion unit for an aircraft including a nacelle which surrounds a turbojet engine. The nacelle has an inner structure surrounding a downstream compartment of the turbojet engine, and the inner structure includes two annular half-portions. The propulsion unit also includes a rail/guide unit and to move the annular half-portions between a working position and a maintenance position. In particular, the rail/guide unit radially moves away the annular half-portions relative to a longitudinal axis of the nacelle, during a translation movement of the annular half-portions. The nacelle is provided with a connecting rod which is connected to the annular half-portions and to the turbojet engine and so that the connecting rod contributes to rotate the annular half-portions about the rail.

15 Claims, 6 Drawing Sheets

(51) Int. Cl.
*F02K 1/78* (2006.01)
*F02K 3/06* (2006.01)
*B64D 29/00* (2006.01)

(56) References Cited

U.S. PATENT DOCUMENTS

| | | | | |
|---|---|---|---|---|
| 6,170,253 | B1* | 1/2001 | Newton | B64D 29/00 239/265.31 |
| 8,657,233 | B2* | 2/2014 | Meseguer Mata | B64D 41/00 244/119 |
| 8,727,275 | B2* | 5/2014 | Aten | F02K 1/72 239/31 |
| 2010/0170984 | A1* | 7/2010 | Journade | B64D 29/08 244/1 N |
| 2010/0327110 | A1* | 12/2010 | Caruel | B64D 29/08 244/54 |
| 2014/0116025 | A1* | 5/2014 | Todorovic | F02K 1/72 60/226.2 |

FOREIGN PATENT DOCUMENTS

| | | |
|---|---|---|
| FR | 2 926 790 A1 | 7/2009 |
| WO | 2012/140368 A1 | 10/2012 |

\* cited by examiner

PROPULSION UNIT FOR AN AIRCRAFT

CROSS-REFERENCE TO RELATED APPLICATIONS

This application is a continuation of International Application No. PCT/FR2013/053048, filed on Dec. 12, 2013, which claims the benefit of FR 12/61960, filed on Dec. 12, 2012. The disclosures of the above applications are incorporated herein by reference.

FIELD

The present disclosure concerns a propulsion unit for an aircraft comprising a turbojet engine and a nacelle surrounding the turbojet engine, and more precisely, it relates to a device for opening and closing an inner structure of the nacelle.

BACKGROUND

The statements in this section merely provide background information related to the present disclosure and may not constitute prior art.

An aircraft is moved by several turbojet engines each housed in a nacelle also accommodating a set of appended actuating devices related to its operation and providing various functions when the turbojet engine is in operation or at shutdown. In particular, these appended actuating devices comprise a mechanical system for actuating thrust reversers.

A nacelle generally presents a tubular structure comprising an air inlet upstream of the turbojet engine, a mid-section intended to surround a fan of the turbojet engine, a downstream section accommodating thrust reversal means and intended to surround the combustion chamber of the turbojet engine, and is generally terminated with an ejection nozzle, the outlet of which is located downstream of the turbojet engine.

Modern nacelles are intended to accommodate a bypass turbojet engine capable of generating via the blades of the rotating fan a hot air flow (also called primary flow) coming from the combustion chamber of the turbojet engine, and a cold air flow (secondary flow) which circulates outside the turbojet engine through an annular passageway, also called flow path. A nacelle for such an engine generally presents an outer structure, called Outer Fixed Structure (OFS), which defines, with a concentric inner structure, called Inner Fixed Structure (IFS), surrounding the downstream compartment of the turbojet engine, which is actually the structure of the engine at the back of the fan, the flow path intended to channel the cold air flow which circulates outside the engine.

The primary and secondary flows are ejected from the engine from the rear of the nacelle. Thus, each propulsion unit of the aircraft is formed by a nacelle and a turbojet engine, and is suspended from a fixed structure of the aircraft, for example under a wing or on the fuselage, via a pylon or a mast fastened to the engine or to the nacelle.

The inner structure of the nacelle is usually formed by two substantially semi-cylindrical half-shells, on either side of the longitudinal vertical plane of symmetry of the nacelle.

The downstream compartment of the turbojet engine, which constitutes the <<core>> area of the turbojet engine, requires periodic maintenance visits.

Indeed, the downstream compartment of the turbojet engine further encloses an accessory gearbox located close to the compressor of the turbojet engine. Typically, this gearbox comprises one or several gear train(s) rotatably driven via the shaft of the compressor on which different accessories are coupled such as for example electrical generators.

The <<core>> area of the turbojet engine also encloses the combustion chamber of the turbojet engine, at the outlet of the compressor, wherein the air/fuel mixture is performed, fuel being introduced in the chamber by a fuel nozzle.

Such equipment should be frequently checked, thereby requiring to have an easy and quick access to the downstream compartment of the turbojet engine.

For this purpose, the half-shells are movably mounted so as to be able to be deployed between a working position where the half-shells form a casing of the downstream compartment of the turbojet engine, and a maintenance position enabling access to the turbojet engine.

In the working position, the half-shells are held in the closed position by means of locks disposed along a junction line located at the lower portion, at <<6 o'clock>>.

According to one solution of the prior art, the half-shells are pivotally mounted about a longitudinal axis forming a hinge at the upper portion of the thrust reverser, at <<12 o'clock>>.

In order to carry out maintenance operations of the turbojet engine, it may be necessary to open the outer structure so as to be able to open the half-shells.

In the case where the outer structure (OFS) is a <<C-duct>>-type structure, that is to say that said structure is constituted by two half-cowls pivotally mounted on hinges positioned at the upper portion of the nacelle, access to the downstream compartment of the turbojet engine is achieved by opening the half-cowls of the outer structure and then opening the half-shells of the inner structure of the nacelle.

When the cowl of the thrust reverser is of the <<D-duct>> type, that is to say, when the half-cowls of the outer structure are connected to the corresponding half-shells of the inner structure by connecting islands, opening the outer structure of the nacelle results in simultaneously opening the inner structure.

In the case of an <<O-duct>>-type outer structure, that is to say when the cowl of the thrust reverser comprises one single annular cowl, extending on either side of an engine pylon to which the nacelle and the turbojet engine are brought back, the aforementioned solution, according to which the half-shells of the inner structure pivot about hinges, is incompatible.

In order to enable opening of the inner structure of the nacelle when the outer structure is fixed or made by an <<O-duct>>-type cowl, there is known a first solution of the prior art, described in the U.S. Pat. No. 4,920,744.

According to this form, access to the downstream compartment of the turbojet engine is provided by a first operation which aims to displace the half-shells downstream of the nacelle, so as to clear the half-shells of the fixed outer structure of the nacelle then by a second operation which aims to drive the half-shells in rotation about an axis parallel to the longitudinal axis of the nacelle, via telescopic connecting rods.

A drawback of this solution is related to the complexity of the mounting and of the opening kinematics, and the time for accessing the areas of the turbojet engine which require frequent maintenance is relatively long.

Another solution described in the French patent application FR 07/01059 and belonging to the Applicant allows overcoming part of the aforementioned drawbacks of the prior art.

The nacelle disclosed by this application comprises an inner structure and an outer structure arranged so as to form a flow channel of the secondary air flow, the inner structure surrounding the turbojet engine and being equipped with means for translational displacement along a rail/slide system substantially parallel to the longitudinal axis of the nacelle, and allowing clearing the downstream compartment of the turbojet engine.

This solution is very advantageous compared to the prior art since it limits the opening kinematics of the inner structure.

Nonetheless, a drawback of this type of structure can for example be identified when the outer cowling of the nacelle is fixed. Indeed, in such a case, translating the inner structure downstream does not allow an easy access to the <<core>> area of the turbojet engine.

SUMMARY

The present disclosure provides a nacelle which allows an easy and quick access to the downstream compartment of the turbojet engine, while limiting the number of interfaces required for switching from a working position to a maintenance position and by simplifying the opening and closing kinematics of the inner structure of the nacelle.

Furthermore, the present disclosure allows switching alternately between a working position and a maintenance position of the inner structure of the nacelle for a <<C-duct>>-type or an <<O-duct>>-type nacelle.

The present disclosure relates to a propulsion unit for an aircraft comprising:

a bypass-type turbojet engine, a nacelle surrounding the turbojet engine, said nacelle comprising a downstream structure comprising an outer structure which defines, with a concentric inner structure surrounding a downstream compartment of the turbojet engine, an annular flow channel, the inner structure being realized in the form of two annular half-portions, means for displacing at least one half-portion, shaped to displace the half-portion alternately between a working position wherein the half-portion forms a shell around the downstream compartment of the turbojet engine, and a maintenance position wherein the half-portion uncovers at least partially said downstream compartment of the turbojet engine, said displacement means comprising at least one rail/slide system providing translational displacement of the half-portion, alternately between the upstream and the downstream of the nacelle, said propulsion unit being characterized in that the rail/slide system is shaped to radially move away the half-portion with respect to a longitudinal axis of the nacelle, during a translational displacement of the half-portion from the upstream toward the downstream of the nacelle, and in that the displacement means further comprise at least one connecting rod connected, on the one hand to the half-portion and on the other hand to the turbojet engine, shaped to drive the half-portion in rotation about said rail, simultaneously during its translational displacement along said rail.

Thus, by providing means for displacing each half-portion combining a rail/slide system and a connecting rod connecting each half-portion to the turbojet engine and shaped to drive each half-portion in rotation about said rail, translation and rotation of the half-portions are simultaneously achieved, which advantageously allows, thanks to a simply designed system, to reduce significantly the time for switching from a working position to a maintenance position.

The rail/slide system provides translation of the inner structure from an upstream position toward a downstream position of the turbojet engine, which allows to clear the upstream portion of the downstream compartment of the turbojet engine. In addition, since the rail/slide system allows to radially move away the half-portion with respect to the longitudinal axis of the nacelle, this allows to move each half-portion away from the volumes of the turbojet engine.

The translational displacement from the upstream toward the downstream of the nacelle drives, in concert, the connecting rod in movement, said connecting rod being shaped to drive the half-portion in rotation about said rail.

The rotational movement of each half-portion about the associated guide rail allows clearing the downstream lower portion of the turbojet engine.

Thus, the upstream portion of the downstream compartment of the turbojet engine and the downstream lower portion of the turbojet engine are fully cleared thanks to the translation of each half-portion from the upstream toward the downstream of the nacelle, said translation causing the rotation of each half-portion about said rail.

According to other features of the present disclosure:

the connecting rod comprises a first end mounted in a ball-joint connection on a lower portion of the half-portion and a second end pivotally mounted on a fixed attachment point of the turbojet engine;

the connecting rod is further shaped to support at least one half-portion in a maintenance position, which allows to avoid providing an appended device for supporting the half-portions in the open maintenance position;

the rail/slide system comprises at least one guide rail secured to the downstream compartment of the turbojet engine;

the guide rail is substantially non-collinear with a longitudinal axis of the nacelle;

either of the ends of the guide rail is located proximate to an engine pylon intended to support said propulsion unit;

Alternatively, the guide rail is supported by an engine pylon intended to support said propulsion unit;

the rail/slide system comprises at least one slide supported by at least one half-portion and shaped to slide along the guide rail;

the slide is secured to an upstream upper portion of said at least one half-portion;

the angle of rotation of the half-portion about said rail is preferably comprised between 0° and 30°.

According to a second form of the propulsion unit, the rail/slide system comprises:

a rail secured to the downstream compartment of the turbojet engine, substantially diametrically opposite to an engine pylon intended to support the propulsion unit, and a slide movable in translation along the rail when activating the actuating means, and the propulsion unit according to the present disclosure is remarkable in that the slide further supports means for displacing at least one of the connecting rods shaped to drive the half-portion in rotation about the rail, when activating the actuating means of said slide.

Thus, thanks to this form, the relative opening of the connecting rods shaped to drive the half-portion in rotation about the rail is substantially increased compared to that obtained thanks to the first form More precisely, the means for displacing at least one of the connecting rods comprise at least one counter connecting rod, one end of which is pivotally mounted on the slide and the other end of which is pivotally mounted on said connecting rod.

Thus, the rail/slide system realized according to the second form allows advantageously reducing the forces supported by the connecting rods shaped to drive the half-portion in rotation about the rail.

Furthermore, according to a variant which is common to both forms of the propulsion unit according to the present disclosure, the downstream compartment of the turbojet engine may be equipped with an accessory gearbox, preferably an accessory gearbox comprising at least two arms defining a <<V>> shape.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
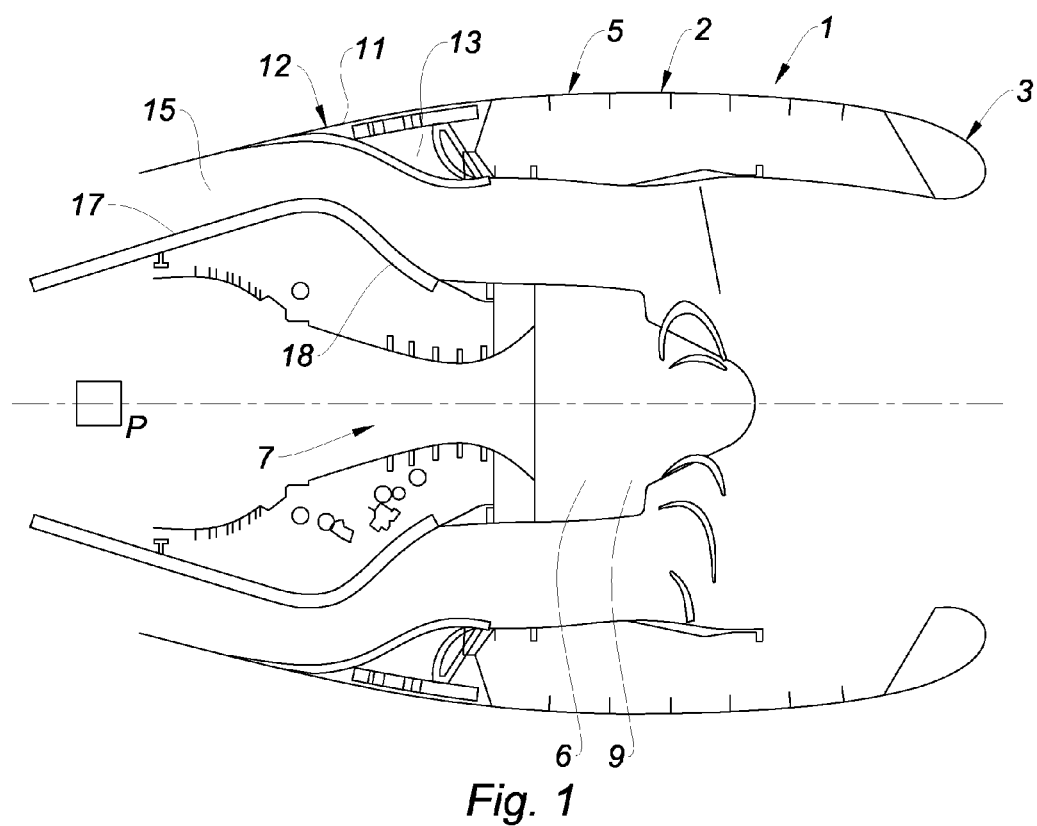
FIG. 1 is a cross-sectional view of a guide assembly according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Moreover, the terms <<upstream>> and <<downstream>> are defined with reference to the flowing direction of the air flow in the nacelle in direct jet operation, the upstream of the nacelle corresponding to a portion of the nacelle through which the flow penetrates, and the downstream corresponding to an area for ejecting said air flow.

Referring to FIG. 1, illustrating a longitudinal section of a propulsion unit 1, said unit comprising a nacelle surrounding a turbojet engine.

The propulsion unit 1 comprises a nacelle 2 comprising an upstream air inlet structure 3, a middle structure 5 surrounding an upstream compartment 6 of a bypass turbojet engine 7, said compartment being constituted by a fan 9, and a downstream structure 11 including an outer structure 12, called OFS, accommodating thrust reversal means 13 and which defines an annular flow channel 15 with a concentric inner structure 17 (IFS) surrounding a downstream compartment 18 of the turbojet engine 7 extending at the back of the fan 9, and constituting the actual engine area (also called <<core>> area).

Figure 2:
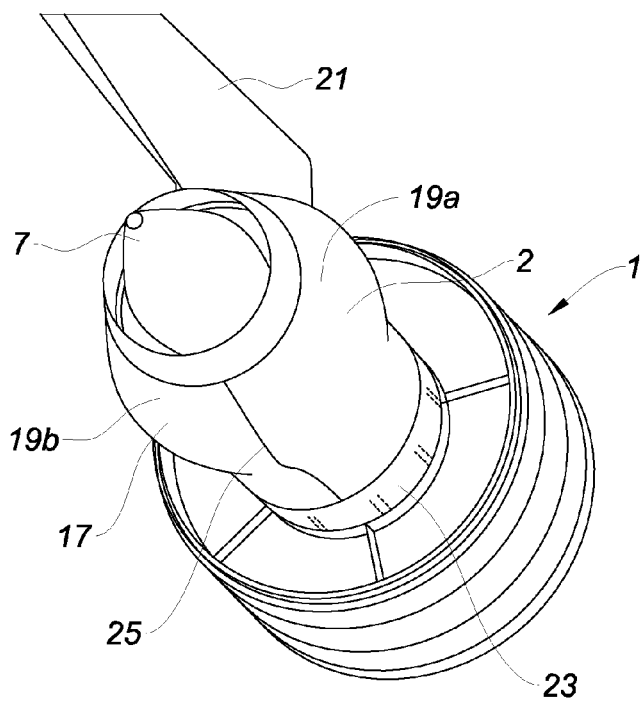
FIG. 2 is a general schematic representation of a nacelle of a turbojet engine comprising a cascade-type thrust reversal downstream structure, the thrust reverser device being in the closed position.

The inner structure 17 of the nacelle, visible in FIG. 2 illustrating the propulsion unit 1 viewed from the downstream of the nacelle, is formed by two annular half-shells or half-portions 19a and 19b, substantially semi-cylindrical, disposed on either side of a longitudinal vertical plane of symmetry P of the nacelle (visible in FIG. 1).

By <<working position>> it is meant, in the present application, a position of the inner structure of the nacelle where the half-portions 19a and 19b form a shell around the downstream compartment of the turbojet engine.

This position is adopted for all the operating phases of the nacelle and/or the turbojet engine, that is to say all phases other than maintenance phases of the turbojet engine.

The nacelle 2 and the turbojet engine 7 are brought to a wing of the aircraft (not represented) via an engine pylon 21, the upstream and middle structures, as well as the outer structure of the downstream structure of the nacelle 2 having been removed for better visibility of the half-portions 19a and 19b of the inner structure 17 of the nacelle.

In the working position, the inner structure 17 of the nacelle is fixed upstream on a frame 23 secured to the turbojet engine 7, and presenting an annular-shaped structure concentrically surrounding the turbojet engine 7. The half-portions 19a and 19b are, in turn, held together in the closed position along a junction line 25 located at the lower portion, for example <<at 6 o'clock>>, by a conventional locking system, well known by those skilled in the art and accordingly will not be further described in the present application.

These two half-portions 19a and 19b may also be axially connected to the turbojet engine, at the front, via conventional locks.

Figure 3:
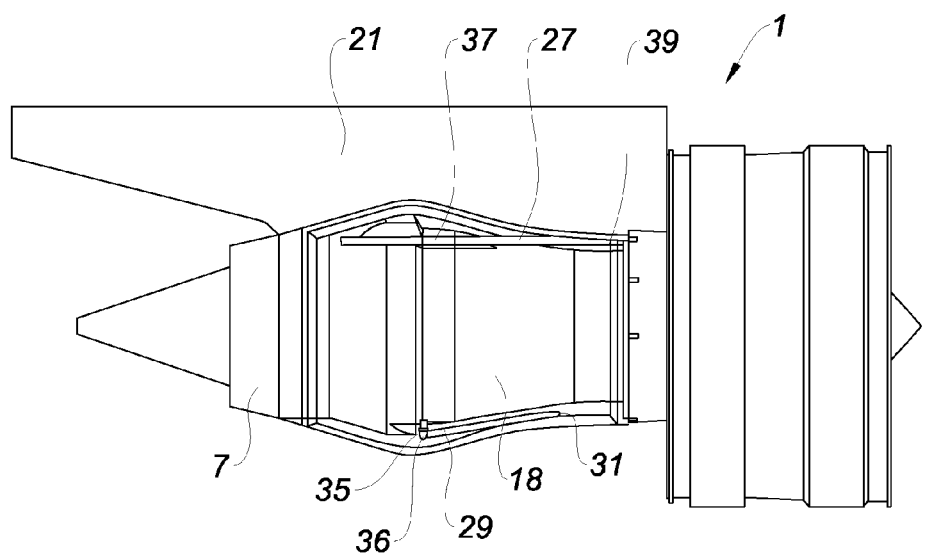
FIG. 3 illustrates the nacelle of FIG. 2, the thrust reverser device being in the deployed position.

Referring to FIG. 3, illustrating a side view of the propulsion unit 1, the upstream, middle and downstream structures of the nacelle having been removed for better visibility, the propulsion unit 1 comprises means for displacing each half-portion, shaped to displace the half-portion alternately between the working position as represented and a maintenance position (represented in FIGS. 7 to 9) wherein the half-portion uncovers at least partially the downstream compartment 18 of the turbojet engine.

The displacement means comprise a rail/slide system 27 and a connecting rod 29 a first end 31 of which is mounted in a ball-joint connection on a lower portion 33 of the half-portion 19a (visible in FIG. 7 for example) and a second end 35 is pivotally mounted on a fixed attachment point 36 of the turbojet engine 7.

The connecting rod 29 is shaped to support the half-portion 19 in the open position when it is in the maintenance position. The present form illustrates one single connecting rod for each half-portion. It may of course be considered to connect each half-portion to the turbojet engine via a plurality of connecting rods.

The rail/slide system 27 comprises in turn a guide rail 37 mounted on the downstream compartment 18 of the turbojet engine 7, one end of which is located proximate to the engine pylon 21, and a slide 39 shaped to slide along the guide rail 37.

Alternately, the guide rail 37 may be directly supported by the pylon 21.

In one form, the slide is provided at an upstream upper portion 41 of the half-portion 19*a* (visible in FIGS. 7 and 8, for example) of the inner structure of the nacelle, inside said inner structure.

As a non-limiting illustration, the length of the guide rail 37 is in the order of 1400 millimeters. Of course, this rail length may be caused to be adapted depending on the length of the inner structure of the nacelle and/or the turbojet engine.

Furthermore, the half-portions 19*a*, 19*b* may comprise centralizers (not represented) which allow positioning in a precise manner the half-portions around the turbojet engine, so as to limit the clearances due to mounting, and thereby providing the aerodynamic continuity inside the annular flow channel of the secondary air flow.

Moreover, the centralizers are sized to support the stresses related to locking and provide taking up the pressure and vibration forces involved when the propulsion unit is in operation. Thus, the centralizers also allow limiting the forces on the rail/slide system, and the sizing of said rail/slide system is optimized in that it is mainly designed to enable the opening and the closing of the half-portions 19*a*, 19*b* of the turbojet engine.

Figure 4:
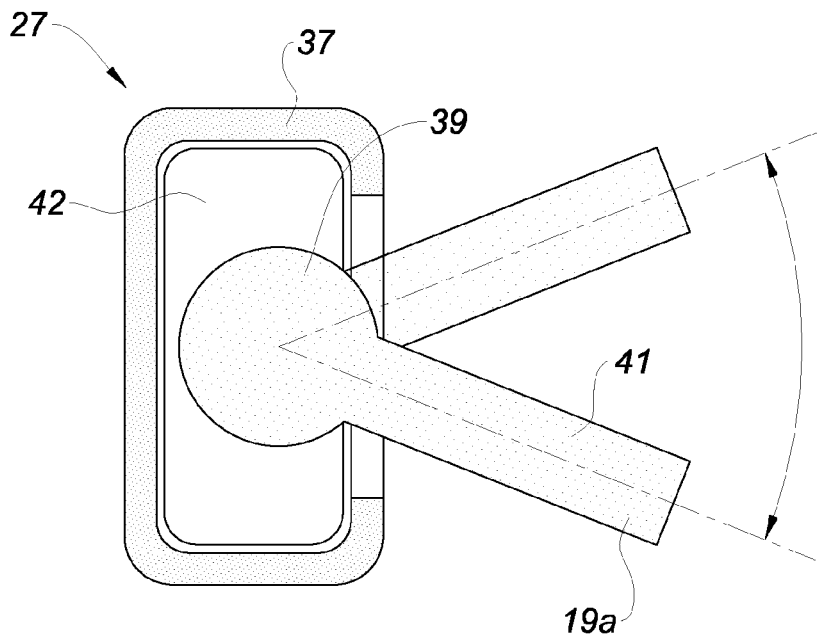
FIG. 4 is a schematic sectional view of the thrust reverser device equipping the nacelle of FIG. 1.

FIG. 4 schematically represents a cross-section of a first form of the rail/slide system 27.

The rail 37 presents a substantially rectangular section, and the slide 39 comprises a gasket 42 sliding along the inner portion of the rail 37, on which the upstream upper portion 41 of the half-portion 19*a* is pivotally mounted about a longitudinal axis of the rail 37.

Figure 5:
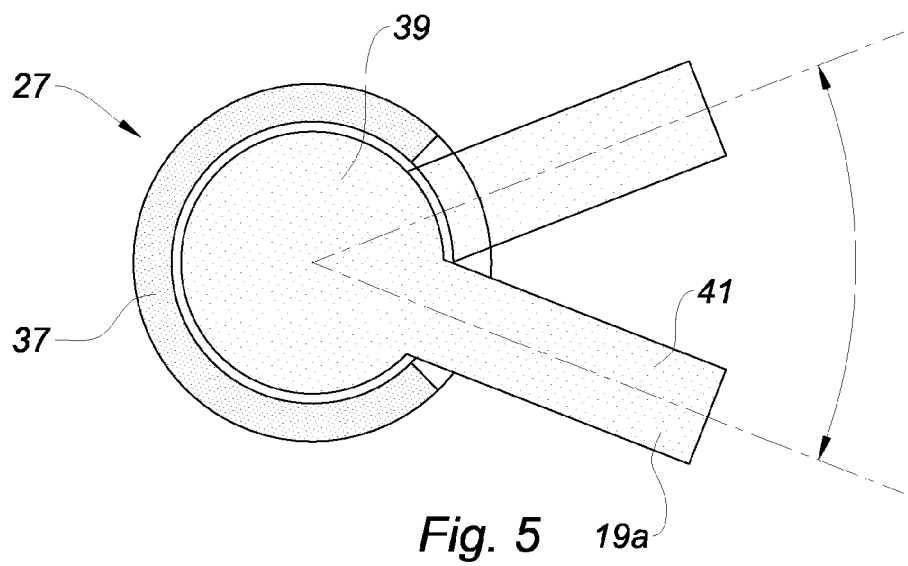
FIG. 5 is a schematic representation of a cascades and front frame structure according to the present disclosure, equipping the thrust reverser device of FIG. 4.

As a variant, and as is represented in FIG. 5, the rail presents a substantially circular section, and the slide 39 is constituted solely by the upstream upper portion 41 of the half-portion 19*a*, adapted to both slide along the inner portion of the rail 37 and to pivot about the longitudinal axis of the rail Regardless of the retained configurations of the rail/slide system, the rail/slide system is shaped to enable an angular displacement of the half-portion 19*a* about the longitudinal axis of the rail 37 in the order of 30°.

In general, the angular displacement of the half-portion 19*a* about the longitudinal axis of the rail 37 is limited by the curvature of the inner lines defining the shell of the turbojet engine. Thus, it may be considered to provide for an opening angle more than 30° by reducing the curvature of the inner lines.

Figure 6:
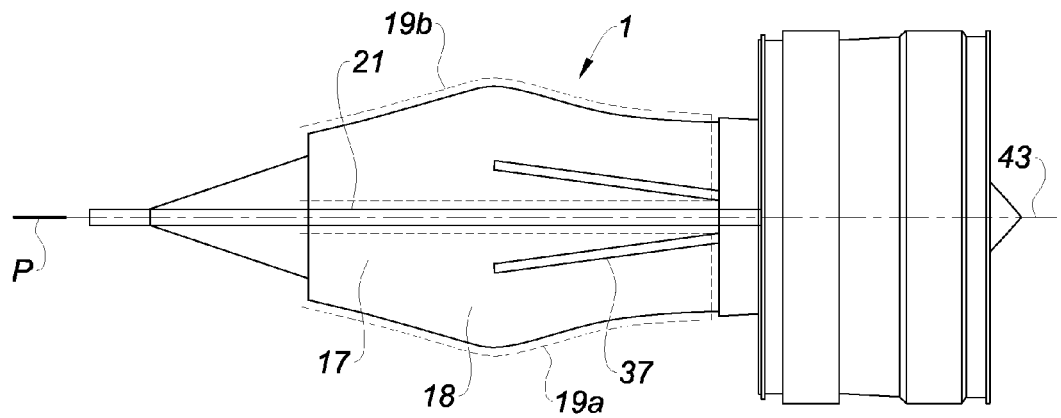
FIG. 6 illustrates the nacelle of FIG. 2 in the maintenance position.

According to the present disclosure, and as is represented in FIG. 6 schematically illustrating a top view of the propulsion unit 1, the guide rail 37 of the rail/slide system, mounted on the downstream compartment 18 of the turbojet engine, close to the pylon 21, forms a non-zero angle with a longitudinal axis 43 of the turbojet engine (or of the concentric nacelle), that is to say that the guide rail is substantially oblique with respect to said longitudinal axis.

Such displacement means constituted by the rail/slide system 27 and by the connecting rod, are also provided for displacing the half-portion 19*b* of the inner structure 17 of the nacelle. The displacement means of the half-portion 19*b* are substantially symmetrical to the displacement means of the half-portion 19*a* with respect to the longitudinal vertical plane of symmetry P of the nacelle.

Figure 7:
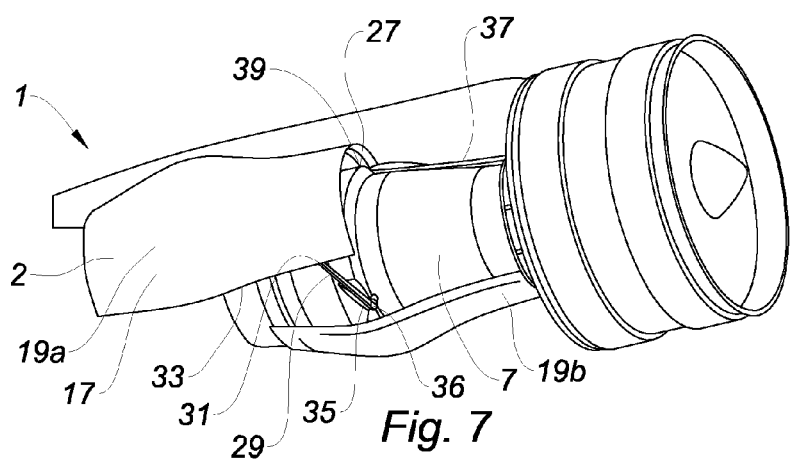
FIG. 7 is a cross-sectional view of a guide assembly according to the present disclosure, when the nacelle is in the standby situation.
Figure 8:
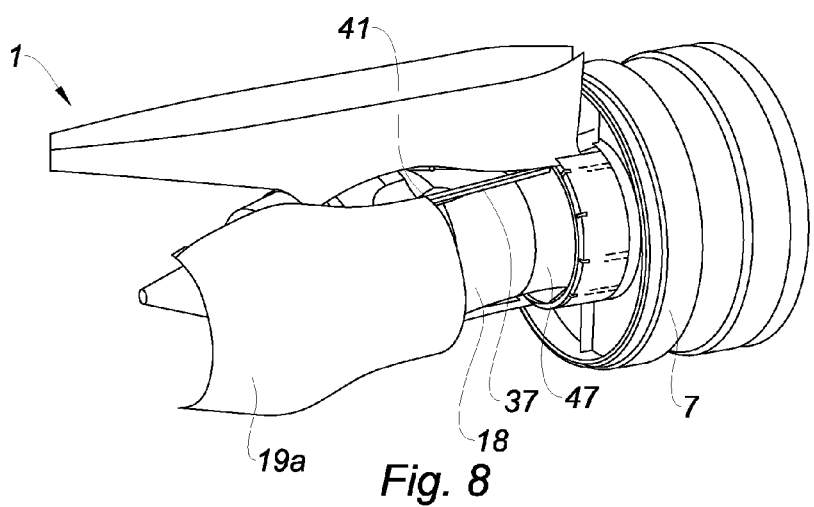
FIG. 8 is a detailed profile view of the guiding element of the guide assembly.
Figure 9:
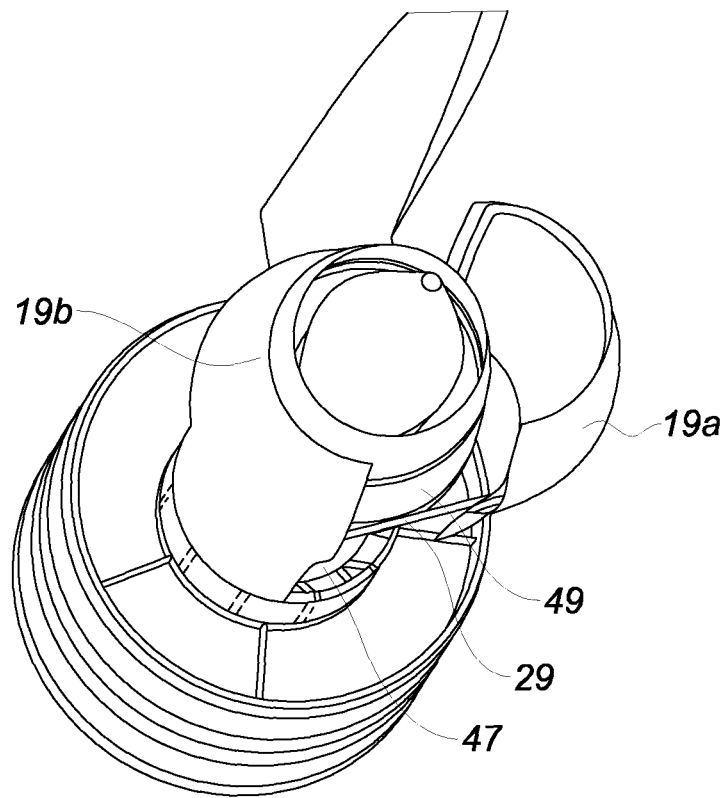
FIG. 9 is a detailed profile view of the guided element of the guide assembly.
Figure 10:
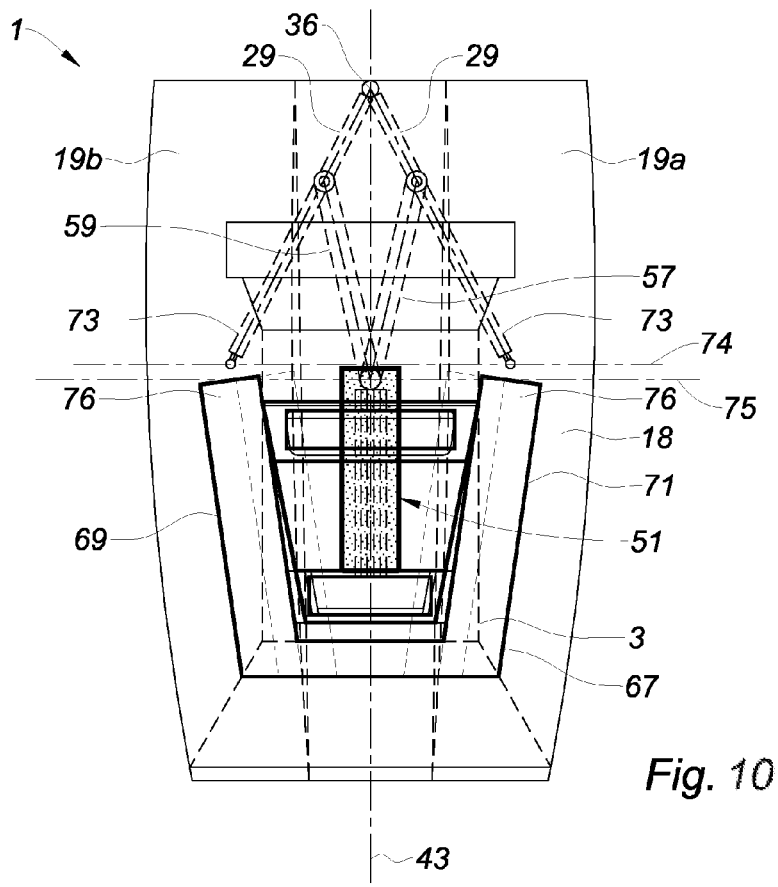
FIG. 10 illustrates the guide assembly according to the present disclosure, when the nacelle is in the operation situation.
Figure 11:
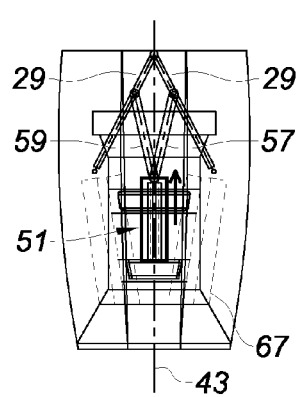
FIG. 11 illustrates the translational movement of a slide of FIG. 10.

Referring now to FIGS. 7 to 9, schematically illustrating the propulsion unit 1 from different viewpoints, the upstream section, the mid-section and the outer structure of the downstream structure of the nacelle having been removed for better visibility.

In these three views, the half-portion 19*a* is represented in the maintenance position, and the half-portion 19*b* is represented in the working position.

Switching alternately the half-portion 19*a* from a working position to a maintenance position is achieved as follows, and the description which is given below applies, mutatis mutandis, for switching alternately the half-portion 19*b* from a working position to a maintenance position The half-portion 19*a* is displaced from the upstream of the nacelle toward the downstream, along the guide rail 37 secured to the turbojet engine, via the slide secured to the upstream upper portion 41 of the half-portion 19*a*.

Putting the half-portion in movement may be achieved manually or via actuating means, such as electrical, mechanical, hydraulic or pneumatic means, which actuates cylinders connected to the half-portion 19*a*.

As described above, the guide rail 37 is non-collinear with the longitudinal axis 43 of the nacelle, which has the effect of radially moving away the half-portion 19*a* with respect to said longitudinal axis when displacing the half-portion from the upstream toward the downstream of the nacelle.

The lower portion 33 of the half-portion 19*a* receives the first end 31 of the connecting rod 29, mounted in a ball-joint connection. The second end 35 of the connecting rod 29 is, in turn, pivotally mounted on the fixed attachment point 36 of the turbojet engine 7.

The translational displacement from the upstream toward the downstream of the nacelle along the guide rail 37 results in pivoting the connecting rod about the fixed attachment point 36 of the turbojet engine 7. The end 31 of the connecting rod 29 drives, in concert, the half-portion 19*a* in rotation about the guide rail 37.

Thus, the upstream portion 47 of the downstream compartment 18 of the turbojet engine 7 and the downstream lower portion 49 of the turbojet engine 7 are fully cleared simultaneously thanks to the step of translating the half-portion 19*a* which results in rotation of said half-portion about said rail.

The translational movement along a direction non-collinear with the longitudinal axis of the nacelle allows moving the half-portions away from the volumes of the turbojet engine, thereby clearing the upstream portion 47 of the downstream compartment of the turbojet engine, and the rotational movement of the half-portions about the guide rail allows opening the half-portion, thereby clearing the downstream lower portion 49 of the turbojet engine.

In particular, clearing the downstream lower portion of the turbojet engine in this manner allows integrating an accessory gearbox.

According to a second form of the propulsion unit 1, represented in FIGS. 10 to 13, the downstream compartment 18 of the turbojet engine 3 further comprises a second rail/slide system 51.

In another form, the rail/slide system 51 is mounted <<at 6 o'clock>>, that is to say in the area diametrically opposite to the pylon 21 receiving the rail/slide system 27 described above. The rail/slide system 51 comprises a rail 53 mounted on the turbojet engine 7, and receives a slide 55 slidably mounted in the rail 53. The longitudinal axis of the rail/slide system 51 is substantially collinear with the longitudinal axis 43 of the nacelle.

Two counter connecting rods 57, 59 connect the slide 55 and the connecting rods 29 connecting the half-portions 19a, 19b and the fixed attachment point 36 of the turbojet engine 7. The ends 61, 62 of the counter connecting rods 57, 59 are pivotally mounted on an axis substantially transverse to the longitudinal axis 43 of the nacelle, disposed substantially close to the end 64 of the slide 55, whereas the ends 65, 66 of the counter connecting rods 57, 59 are pivotally mounted on the connecting rods 29.

The opening kinematics of the half-portions 19a, 19b is as follows: Switching alternately between a working position where the half-portions 19a, 19b form a shell around the downstream compartment of the turbojet engine, and a maintenance position where the half-portions 19a, 19b uncover at least partially the downstream compartment 18 of the turbojet engine 7, is performed by displacing the half-portions 19a, 19b downstream along the rail 37 of the rail/slide system 27.

As described above, the guide rail 37, non-collinear with the longitudinal axis 43 of the nacelle, allows radially moving away the half-portions 19a, 19b with respect to the longitudinal axis 43 of the nacelle when displacing the half-portions from the upstream toward the downstream of the nacelle.

Displacing the half-portions 19a, 19b is this time achieved manually or by activating electrical, mechanical, hydraulic or pneumatic actuating means which actuate cylinders (not represented) secured to the slide 55.

Figure 12:
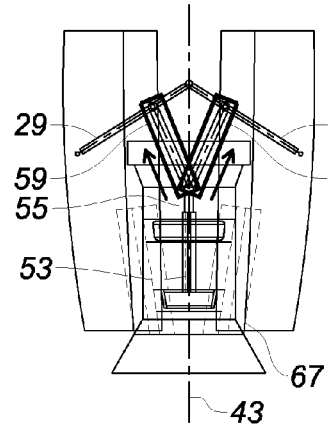
FIG. 12 illustrates the pivotal movement of counter connecting rods of FIG. 10.
Figure 13:
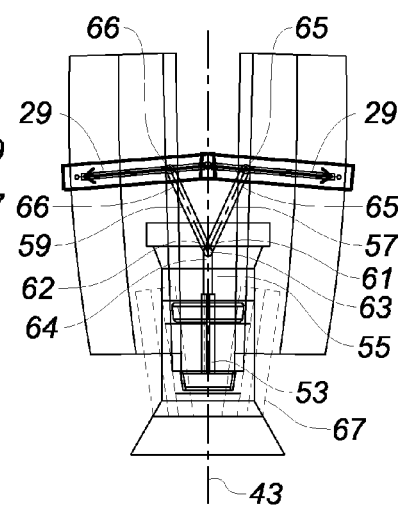
FIG. 13 illustrates the pivotal movement of connecting rods of FIG. 10.

The translational movement of the slide 55, from the upstream toward the downstream of the nacelle, along the rail 53 results in simultaneously displacing the half-portions 19a, 19b downstream and pivoting the counter connecting rods 57, 59 about an axis substantially transverse to the longitudinal axis 43 of the nacelle (see FIG. 12).

Pivoting the counter connecting rods 57, 59, pivotally mounted on the connecting rods 29, results in pivoting the connecting rods 29 which, in turn, drive the half-portions 19a, 19b in rotation about the guide rail 37.

As previously described, the upstream portion 47 of the downstream compartment 18 of the turbojet engine 7 and the downstream lower portion 49 of the turbojet engine 7 are fully cleared when opening the half-portions 19a, 19b.

Nonetheless, the rail/slide system 51 and the counter connecting rods 57, 59, described with reference to the second form of the present disclosure, allow increasing the relative opening of the two half-portions 19a, 19b compared to that obtained thanks to the first form.

Indeed, the assembly which comprises the rail/slide system 51, the counter connecting rods 57, 59 and the connecting rods 29, constitutes an opening system which can be assimilated to an <<umbrella system>>, allowing increasing the relative opening of the connecting rods 29 while limiting the forces sustained by the connecting rods 29 when opening the half-portions 19a, 19b.

As has been seen, by increasing the relative opening of the connecting rods 29 in this manner, risks of contact between the connecting rods 29 and the downstream compartment of the turbojet engine are reduced.

This further allows facilitating the integration of an accessory gearbox. As is schematically represented in FIGS. 10 to 13, the downstream compartment of the turbojet engine is equipped with an accessory gearbox called <<V>>-shaped accessory gearbox 67, constituted for example by a hub on which there are mounted two arms 69, 71 which support equipment.

In the working position, where the half-portions 19a, 19b form a shell around the downstream compartment of the turbojet engine, the ends 73 of the connecting rods 29 define a transverse plane 74 (with respect to the longitudinal axis 43 of the nacelle) which is substantially offset with respect to the transverse plane 75 defined by the downstream ends 76 of the arms 69, 71, which allows reducing risks of contact between the connecting rods 29 and the gearbox 67.

Thus, the second form is in particular advantageous compared to the first form in that the downstream compartment 18 of the turbojet engine 3 may now support a <<V>>-shaped accessory gearbox 67, without the half-portions 19a, 19b abutting against the accessory gearbox 67 when they are opened.

In particular, such a <<V>>-shaped accessory gearbox 67 improves the performances of the turbojet engines, compared to an accessory gearbox presenting another shape.

Unlike the state of the art, the present disclosure allows clearing the two portions of the downstream compartment 18 of the turbojet engine thanks to one single kinematic step, that of translating the half-portion along the rail 37, which significantly simplifies the mechanism of switching from a working position toward a maintenance position, and which consequently largely reduces the time for accessing the turbojet engine.

Moreover, it should be well understood that switching the inner structure of the nacelle from a working position to a maintenance position is not necessarily related to one form of the outer structure.

To this end, the description which has been made applies to outer structures of O-duct type or C-duct type nacelles.

Furthermore, opening the inner structure may also be achieved simultaneously with the step of opening the outer structure of the nacelle, through driving connecting rods connecting the outer structure to the inner structure.

Finally, it goes without saying that the present disclosure is not limited to the sole forms of this propulsion unit, described above only as illustrative examples, instead, it encompasses all variants involving the technical equivalents of the described means as well as their combinations if they are within the scope of the present disclosure.

What is claimed is:

1. A propulsion unit for an aircraft comprising:
   a bypass-type turbojet engine;
   a nacelle surrounding the turbojet engine, the nacelle comprising a downstream structure comprising an outer structure which defines, with a concentric inner structure surrounding a downstream compartment of the turbojet engine, an annular flow channel, the concentric inner structure being realized in a form of two annular half-portions; and
   means for displacing and for guiding at least one of the two annular half-portions, the displacing and guiding means being configured to displace and to guide said at least one of the two half-portion alternately between a working position wherein the two annular half-portions form a shell around the downstream compartment of the turbojet engine, and a maintenance position wherein said at least one annular half-portion uncovers at least partially the downstream compartment, the displacing and guiding means comprising at least one rail/slide system providing translational guiding of said at least one annular half-portion, alternately between an upstream and a downstream of the nacelle, and at least one connecting rod connected, on the one hand to said at least one annular half-portion and on the other hand to the turbojet engine, said at least one annular half-portion being pivotally mounted onto said at least one rail/slide system, wherein the rail/slide system is configured to radially move away with respect to a longitudinal axis of the nacelle at least an upstream upper portion of the at least one annular half-portion through which said half-portion is pivotably mounted on the rail/slide system, during a displacement of said at least one annular half-portion from the upstream toward the downstream of the nacelle, and wherein said connecting rod is configured to drive the at least one annular half-portion in rotation about an axis along which at least one guide rail of the rail/slide system extends, simultaneously with the displacement of the at least one annular half-portion along said guide rail.

2. The propulsion unit according to claim 1, wherein said at least one connecting rod comprises a first end mounted in a ball-joint connection on a lower portion of said at least one annular half-portion and a second end pivotally mounted on a fixed attachment point of the turbojet engine.

3. The propulsion unit according to claim 1, wherein said at least one connecting rod supports said at least one annular half-portion in the maintenance position.

4. The propulsion unit according to claim 1, wherein said at least one guide rail of the rail/slide system is secured to the downstream compartment of the turbojet engine.

5. The propulsion unit according to claim 4, wherein the axis along which said at least one guide rail extends is substantially non-collinear with a longitudinal axis of the nacelle.

6. The propulsion unit according to claim 4, wherein one of ends of said at least one guide rail is located close to an engine pylon supporting the propulsion unit.

7. The propulsion unit according to claim 4, wherein said at least one guide rail is supported by an engine pylon supporting the propulsion unit.

8. The propulsion unit according to claim 4, wherein the rail/slide system comprises at least one slide supported by said upstream portion of at least one annular half-portion, said at least one slide configured to slide along said at least one guide rail.

9. The propulsion unit according to claim 8, wherein said upstream portion of the at least one annular half-portion is located in an upstream upper area of said at least one annular half-portion.

10. The propulsion unit according to claim 1, wherein an angle of rotation of said at least one annular half-portion about said at least one rail is between 0° and 30°.

11. The propulsion unit according to claim 1, wherein the means for displacing and for guiding at least one of the two half-portions comprise a second rail/slide system comprising:
 a rail secured to the downstream compartment of the turbojet engine, substantially diametrically opposite to an engine pylon supporting the propulsion unit; and
 a slide movable in translation along the rail when activating actuating means,
 wherein the slide further supports the displacing means when activating the actuating means of the slide.

12. The propulsion unit according to claim 11, wherein the displacing means comprise at least one counter connecting rod, one end of which is pivotally mounted on the slide and other end of which is pivotally mounted on said at least one connecting rod.

13. The propulsion unit according to claim 1, wherein the downstream compartment of the turbojet engine is equipped with an accessory gearbox.

14. The propulsion unit according to claim 13, wherein the accessary gearbox comprises at least two arms forming V-shape.

15. The propulsion unit according to claim 1, wherein the guide rail of the rail/slide system is shaped so that the axis along which the guide rail extends is substantially non-collinear with the longitudinal axis of the nacelle and is shaped to radially move away from said longitudinal axis when progressing to downstream area of said propulsion unit.

* * * * *